United States Patent [19]
Zima et al.

[11] Patent Number: 5,453,048
[45] Date of Patent: Sep. 26, 1995

[54] COUPLING ASSEMBLY

[75] Inventors: Leonard C. Zima, East Aurora; Timothy P. Seel, Tonawanda, both of N.Y.

[73] Assignee: Roberts-Gordon, Inc., Buffalo, N.Y.

[21] Appl. No.: 229,572

[22] Filed: Apr. 19, 1994

[51] Int. Cl.⁶ .................................................. B08B 15/00
[52] U.S. Cl. ........................... 454/63; 285/238; 285/318
[58] Field of Search ..................................... 285/235, 238, 285/262, 318; 454/63, 64, 166, 167

[56] References Cited

U.S. PATENT DOCUMENTS

| | | | |
|---|---|---|---|
| 561,441 | 6/1846 | Schmidt | 285/238 X |
| 2,922,665 | 1/1960 | Beyer | 285/318 X |
| 4,102,254 | 7/1978 | Grant | 454/63 |
| 5,092,228 | 3/1992 | Pfeiffer et al. | 454/63 |
| 5,094,494 | 3/1992 | McConnell | 285/318 |
| 5,096,230 | 3/1992 | Pausch et al. | 454/63 X |
| 5,162,017 | 11/1992 | Nordin | 454/63 X |

FOREIGN PATENT DOCUMENTS

| | | | |
|---|---|---|---|
| 1277484 | 10/1961 | France | 285/318 |
| 430130 | 10/1983 | Sweden . | |
| 718587 | 11/1954 | United Kingdom | 285/318 |

OTHER PUBLICATIONS

"Sliding Balancer Track", Filterclean Corp., Sec. V, p. 1.
Nederman "Magnotrack" brochure, Hederman, Inc., No. 13–3.
Tykron "Vehicle Emission Capture Systems" brochure, Symplair S20, Tyron Inc.

Primary Examiner—Harold Joyce
Attorney, Agent, or Firm—John C. Thompson

[57] ABSTRACT

A coupling assembly (56) for coupling an exhaust system to a pipe through which hot gases are discharged. The coupling assembly (56) couples the exhaust pipe (54) of a vehicle (16) to a flexible exhaust suction hose (42) of a vehicle emission capture system (10) of the type that discharges vehicle exhaust gases from within a structure (12) to a location outside of the structure. The coupling assembly includes two portions, one portion being a rubber-like boot (62) which is secured to the free end (42.3) of a flexible suction hose (42), the rubber-like boot carrying near its free end (62.2) a garter spring (64), and the other portion of the coupling assembly being a ball adaptor (60) which may be secured to the tail pipe (54) of a vehicle. The ball adaptor has a connection portion (60.1) and a spherical portion (60.3) through which hot exhaust gases may pass. The major external diameter of the spherical portion of the ball adaptor is slightly greater than the internal diameter of the garter spring (64). By following this design it is possible to slip the garter spring (64) loosely over the ball adaptor (60) to connect the flexible exhaust hose (42) to the tail pipe (54) of the vehicle, the garter spring (64) permitting a disconnect from the tail pipe as the vehicle exits a structure. When the two portions are assembled together, the boot portion is loosely supported by the ball adapter permitting the boot to freely rotate relative to the ball adaptor as the vehicle is moved, and to permit cooling ambient air to enter the flexible hose.

6 Claims, 4 Drawing Sheets

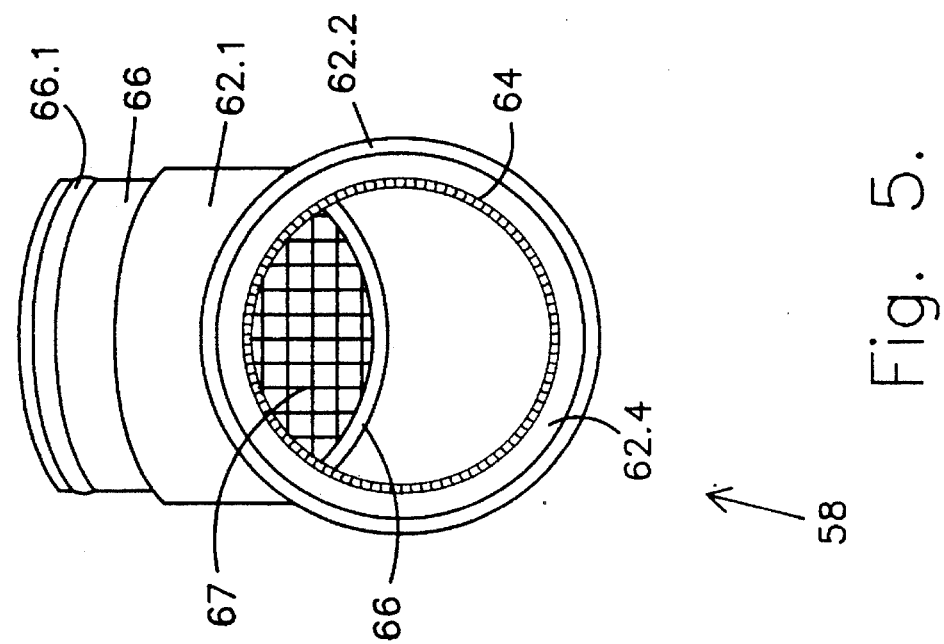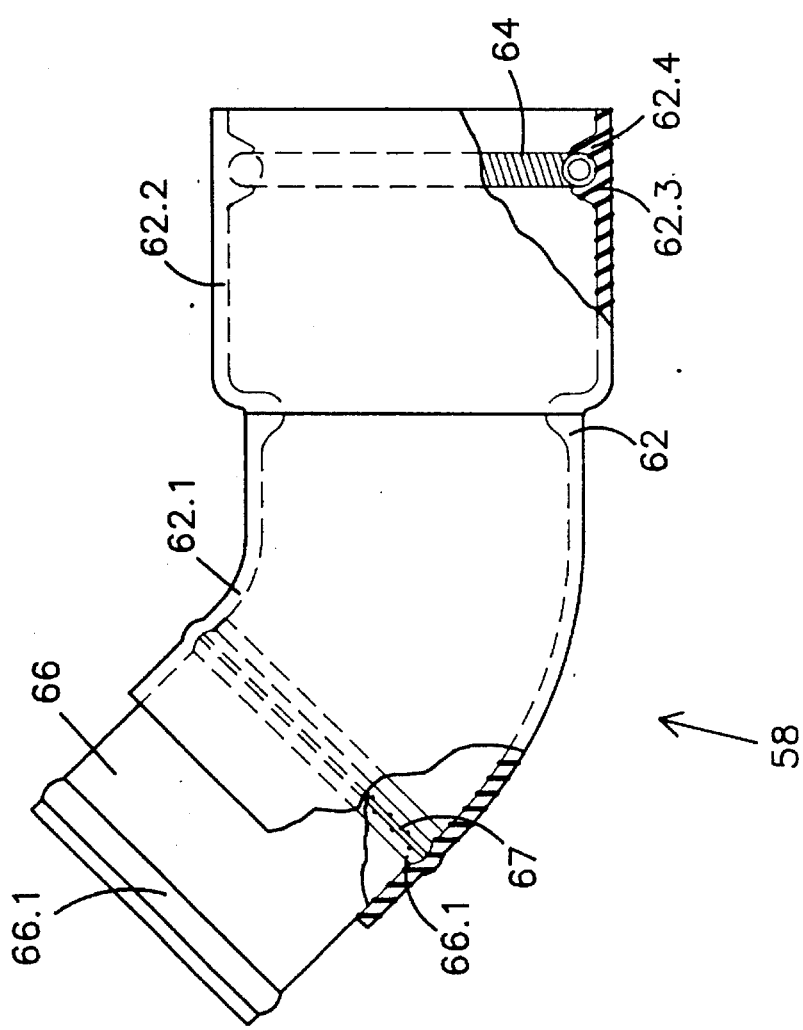

COUPLING ASSEMBLY

TECHNICAL FIELD

The present invention relates generally to a coupling assembly for coupling an exhaust system to a pipe through which hot gases are discharged, and more particularly to a coupling assembly for coupling the exhaust pipe of a vehicle to a flexible exhaust suction hose of a vehicle emission capture system of the type that discharges vehicle exhaust gases from within a structure to a location outside of the structure.

BACKGROUND OF THE INVENTION

Emission control systems are well known in the art for connecting an exhaust suction hose to the exhaust or tail pipe of a vehicle. One such system is the SYMPLAIR™ S20 vehicle emission capture system manufactured by Tykron Inc. of Grimsby, Ontario. This prior art system includes ductwork which extends from one side of a swivel ball to a fan which in turn discharges fumes from within a structure. The other side of the swivel ball is connected to a flexible exhaust hose which has a free end spaced away from the swivel ball. An intermediate portion of the flexible hose is supported by a spring take-up reel carried by a trolley on a suitable track. The free end of the exhaust hose of the SYMPLAIR™ S20 vehicle emission capture system carries a pliers-like clamping device which may be used to secure the free end of the flexible hose to the exhaust pipe of a vehicle. The pliers-like coupling device has been developed so that as the vehicle exits from the structure the coupling device will disconnect from the exhaust pipe of the vehicle. This type of system allows mobility of a vehicle over a limited range within a structure, and has the advantage of discharging exhaust fumes from within the structure when the vehicle is operated within the structure. The SYMPLAIR™ S20 vehicle emission capture system finds particular application in fire stations where it is desirable that vehicles should be exhausted up to the point where they leave the building, thereby preventing contamination of the firemen's on site living quarters, which are frequently above the vehicle bays. While the SYMPLAIR™ S20 vehicle emission capture system has performed satisfactorily, the mechanical pliers-like coupling device has not always performed in a satisfactory manner when the vehicle is exiting the structure. The principal disadvantage of the pliers-like coupling device has been that the metal parts have been shown to occasionally damage the finish of expensive equipment, such as for example a fire vehicle. On rare occasions, when the coupling device has not been properly attached, damage to the exhaust system has occurred.

To overcome the deficiencies of the foregoing type of mechanical attachment device, an alternative connection system has been developed which is shown in U.S. Pat. No. 5,162,017. In this device an intermediate portion of the flexible exhaust suction hose carries an electromagnet which is adapted to be coupled to a specific site on the vehicle, there being a leaf spring extending from the area of the electromagnet to free end of the flexible hose, the leaf spring being designed to maintain the free end of the suction hose about the end of the exhaust pipe of the vehicle. Although this form of device eliminates some of the disadvantages of the prior art, it adds complications in that the electromagnet does not always properly disconnect as the vehicle is exiting the structure. In addition, such a device tends to be more expensive than other prior art.

One of the disadvantages of the SYMPLAIR™ S20 vehicle emission capture system, as well as the system shown in U.S. Pat. No. 5,162,017, is that as the vehicle moves, the hose tends to twist about its axis making the alignment of the disconnect difficult to achieve. In this regard it should be noted that the angle at which the hose is pulled from the vehicle effects the disconnect.

OBJECTS AND SUMMARY OF THE INVENTION

It is an object of the present invention to provide a coupling assembly for coupling an emission system to a pipe or the like, which coupling assembly is of a relatively low cost design, and which will overcome the disadvantages of other known prior art designs.

More particularly, it is an object of the present invention to provide a coupling assembly for connecting a flexible exhaust suction hose to the exhaust pipe of a vehicle, which exhaust suction hose permits the discharge of exhaust gases of a vehicle from within a structure, the coupling assembly disconnecting from the exhaust pipe of the vehicle when the vehicle exits from the structure, and which coupling assembly will not damage the vehicle during its disconnect.

It is an additional object of the present invention to provide a coupling assembly for coupling an emission control system to a vehicle, the coupling assembly having a portion which may freely rotate about its axis so that a disconnection is facilitated when a vehicle exits a structure.

The foregoing objects of this invention are accomplished by forming a coupling assembly of two portions, one portion being a rubber-like boot which is secured to the free end of a flexible suction hose, the rubber-like boot carrying near its free end a garter spring, and the other portion of the coupling assembly being a ball adaptor which may be secured to the tail pipe of a vehicle, the external diameter of the ball adaptor being slightly greater than the internal diameter of the garter spring. By following this design it is possible to slip the garter spring loosely over the ball adaptor to connect the flexible exhaust hose to the tail pipe of the vehicle, the garter spring permitting a disconnect from the tail pipe as the vehicle exits a structure. When the two portions are assembled together, the boot portion is loosely supported by the ball adapter permitting the boot to freely rotate relative to the ball adaptor as the vehicle is moved, and to permit cooling ambient air to enter the flexible hose.

The foregoing objects and other objects and advantages of this invention will become more apparent to those having ordinary skill in the art after a consideration of the following detailed description taken in conjunction with the accompanying drawings in which a preferred form of this invention is illustrated.

BRIEF DESCRIPTION OF THE DRAWINGS

FIG. 1 is a view illustrating how a vehicle emission capture system may be mounted within a firehouse or the like.

FIGS. 4 and 5 are side and end views of the rubber-like boot and garter spring portion of the coupling assembly shown in FIG. 3.

DETAILED DESCRIPTION

Figure 1:
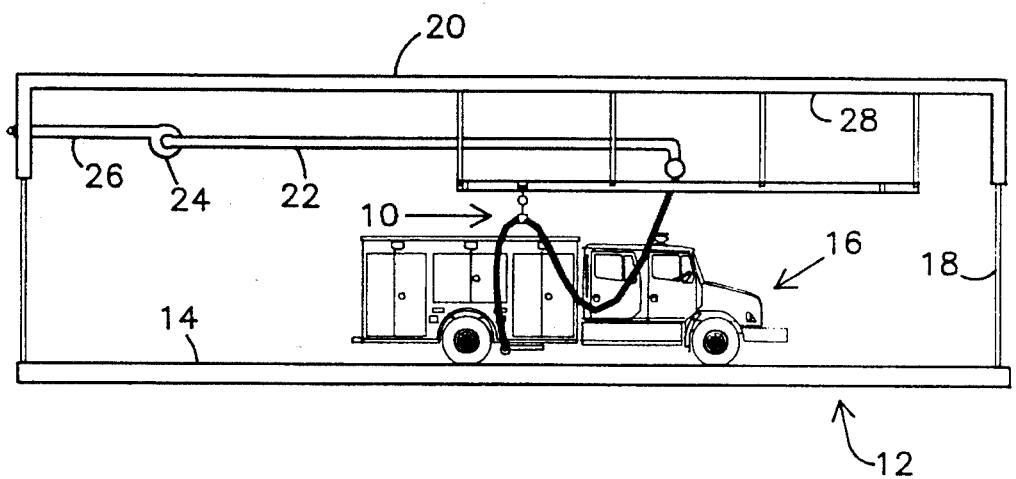
Figure 2:
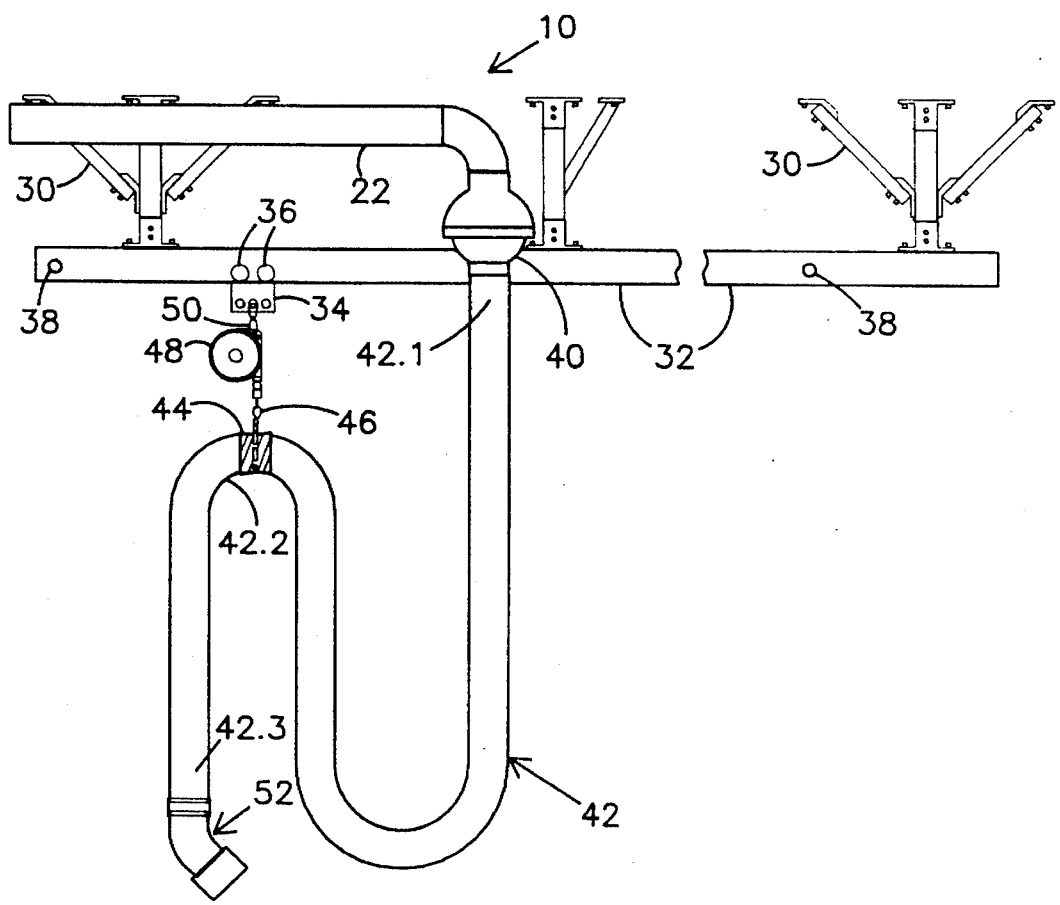
FIG. 2 is an enlarged view of a portion of the structure shown in FIG. 1.

With reference initially to FIGS. 1 and 2, a prior art vehicle emission capture system is indicated generally at 10, the system being shown installed in a firehouse which is indicated generally at 12, only a portion of the firehouse being illustrated. While only one bay of the firehouse is illustrated in FIG. 1, it should be appreciated that the firehouse may consist of multiple bays which may require multiple vehicle emission capture systems. Each bay includes a floor 14 which can support a vehicle indicated generally at 16. The structure 12 also includes at least one doorway 18 through which the vehicle can exit. As illustrated the firehouse includes a second floor 20 which may serve as living quarters for the firemen. The vehicle emission capture system 10 includes duct-work 22 connected to a fan 24, the fan in turn discharging gases from the structure through a discharge passageway 26. The duct-work 22, fan 24 and discharge passageway can be supported in any conventional manner from the ceiling 28 of the bay. Also supported from the ceiling 28 by struts 30 is a roller trolley track 32 which in turn supports a movable trolley 34, the trolley having rollers 36. Trolley stops 38 are provided at either end of the trolley track 32 to limit the movement of the movable trolley 34.

One side of a swivel ball 40 is connected to the end of the duct-work 22 remote from the fan 24. The other or lower side of the swivel ball 40 is connected to one end 42.1 of a flexible exhaust suction hose 42. The hose 42 has an intermediate portion 42.2 which is supported by a saddle 44 and chain 46 from a spring take-up reel 48. The reel is in turn supported by a further chain 50 which extends from the movable trolley 34. The free end 42.3 of the flexible exhaust suction hose 42 is connected in any suitable manner to a coupler which is indicated generally at 52. In the prior art SYMPLAIR™ S20 vehicle emission capture system referred to above the coupler is provided with a pliers-like clamp which can secure the coupler to the tail pipe 54 (FIG. 6) of a vehicle. When so connected, it can be seen that as the vehicle 16 moves from the left to the right as shown in FIG. 1 that the trolley 34 will roll upon the track 32 until it contacts the right-hand stop 38. As the vehicle exits through the doorway 18 the adapter will be pulled off the vehicle tailpipe.

Figure 3:
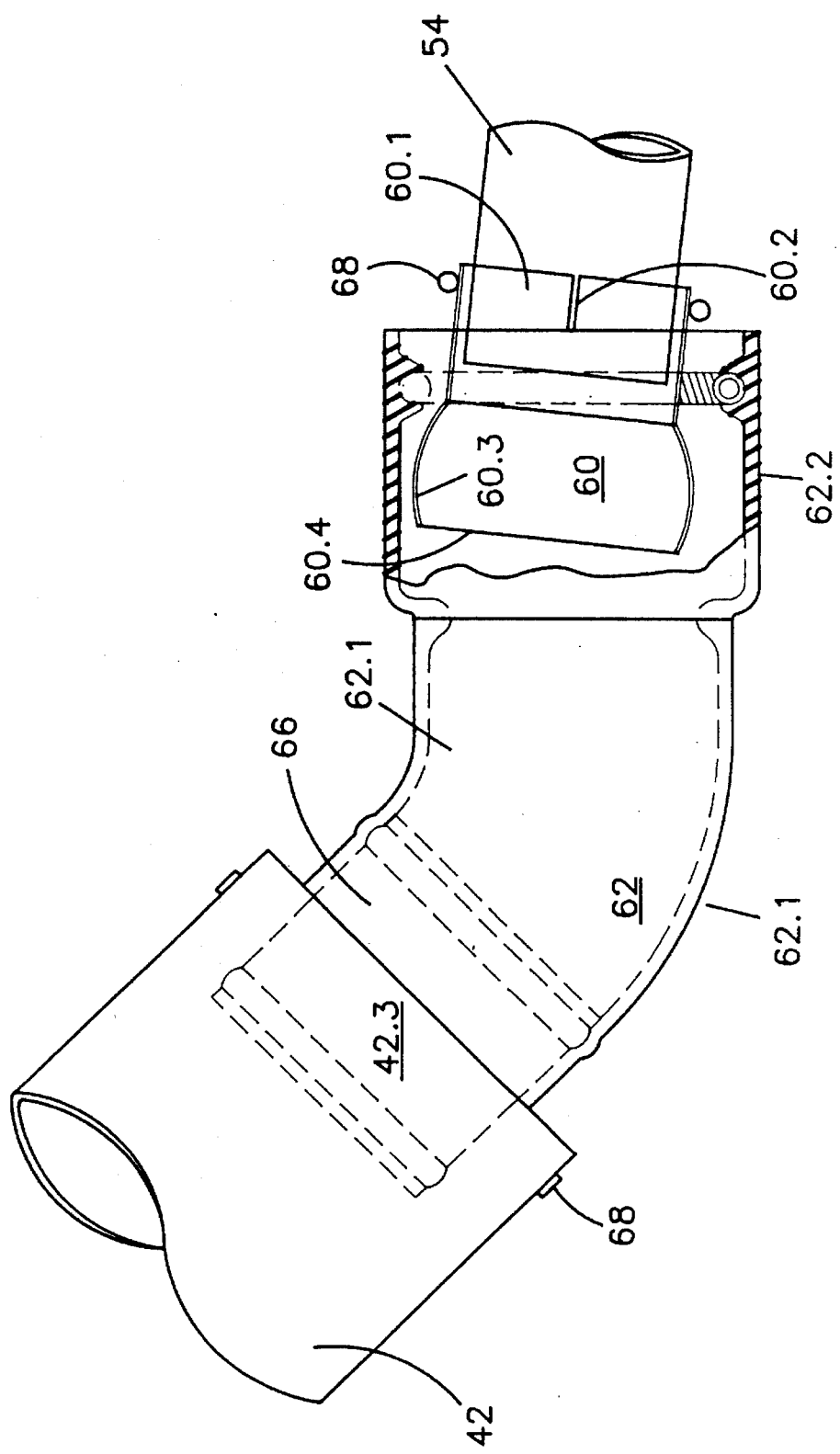
FIG. 3 is an enlarged view, partially in section, illustrating the coupling assembly of this invention.
Figure 6:
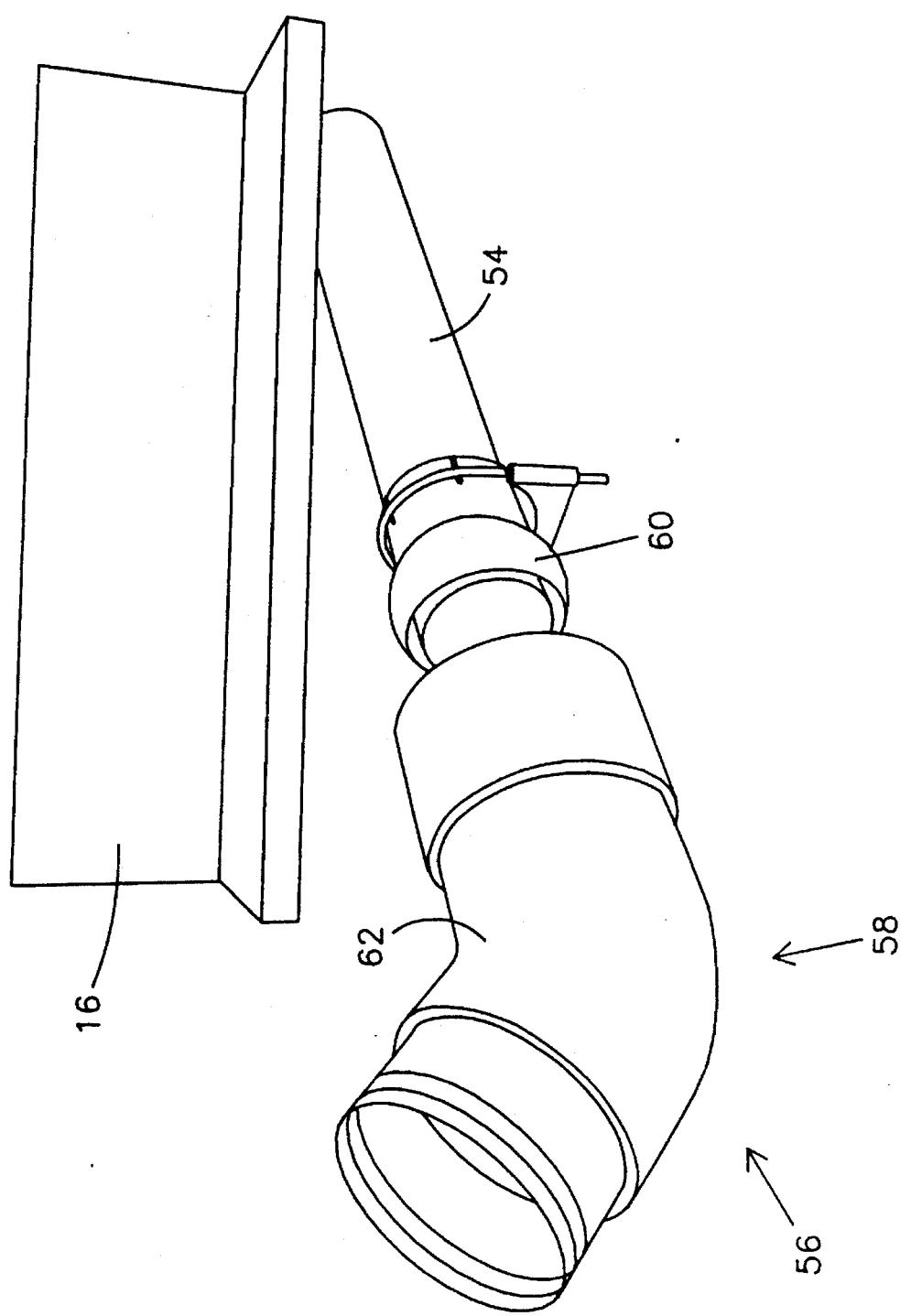
FIG. 6 is a perspective view showing the coupling assembly of this invention connected to the tail pipe of a vehicle.

The novel coupler of this invention is indicated generally at 56, and is best shown in FIGS. 3 and 6. The coupler assembly is formed of two portions, one being the boot sub-assembly portion, indicated generally at 58, and best illustrated in FIGS. 4 and 5. In addition the coupler assembly further includes a ball adapter 60, shown in FIGS. 3 and 6. The boot portion 58 consists of three elements, namely a spring boot 62 formed of a rubber-like material, such as EPDM rubber, a garter spring 64, and a hose coupler 66. The spring boot consists of a 45° elbow section 62.1 and a bell shaped end 62.2 having a greater internal diameter than the 45° elbow section. For example the bell shaped end may have an internal diameter of 6 inches, whereas the 45° elbow section 62.1 may have an internal diameter of only 5 inches. The garter spring is received within a groove disposed between two inwardly extending annular abutments 62.3 and 62.4 formed within the bell shaped end 62.2. In order to facilitate the connection of the rubber boot 62 to the free end of the flexible exhaust suction hose 42, the hose coupler 66 is provided. The hose coupler is preferably formed of a suitable metal or metal-like pipe (or duct) having an external diameter essentially the same as the internal diameter of the of the 45° elbow section of the boot. Each end of the hose coupler 66 is formed with a bead 66.1. One end of the hose coupler is secured to the boot 62 by coating the one end with a suitable adhesive, and then telescoping the one end within approximately the last two inches of the 45° elbow section, the adhesive then being permitted to cure. The other end of the coupler 66 is secured to the free end 42.3 of the flexible exhaust suction hose by telescoping it within the free end and then clamping it in place by means of a hose clamp 68. In this manner the boot portion 58 may be removed from the hose portion 42 if necessary. The garter spring 64 is so dimensioned that it will be snugly received within the groove between the abutments 62.3 and 62.4 so it will not be necessary to adhesively secure it in place.

The ball adaptor portion 60 of the coupler assembly is formed of metal or another similar rigid material. At one end the ball adaptor has a cylindrical coupling portion 60.1 provided with expansion slots 60.2, and at the other end the ball adaptor has a spherical ball portion 60.3. The cylindrical portion is so shaped that it can be readily secured to the exhaust pipe of a vehicle. In the embodiment illustrated, the ball adaptor is adapted to be secured to a cylindrical exhaust pipe having an external diameter of 4 inches. The cylindrical portion 60.1 is therefore provided with an internal diameter the same or just slightly more than the external diameter of the exhaust pipe. The slots 60.2 insure that the cylindrical coupling portion 60.1 can be slipped about the end of the tail pipe 54, and may be secured thereto, as for example, by a guillotine clamp 70. The portion of the ball adapter spaced away from the cylindrical coupling portion is formed with a spherical portion having a major external diameter slightly greater than the normal internal diameter of the garter spring 64. In the example illustrated in the drawings, the major diameter of the spherical portion 60.3 of the ball adaptor is 5 inches, and the internal diameter of the garter spring is 4.87 inches ±0.03 inches. However, the end of the spherical portion 60.3 spaced away from the slots 60.2 is of a diameter less than the internal diameter of the garter spring. Again, in the example shown, the external diameter of the end 60.4 of the ball adaptor is 4.6 inches, which is substantially less than the internal diameter of the garter spring.

In operation, the coupler assembly is initially installed with the ball adaptor being secured to the tail pipe of a vehicle, and the boot sub-assembly 58 being secured to the free end of the flexible exhaust suction hose. Then when a vehicle has been positioned within a building with the exhaust pipe below the track 32, it is only necessary to slip the boot 58 about the ball adaptor 60, the garter spring expanding slightly during installation until it has passed over the spherical portion 60.3. When the fan 24 is on, and when the motor within the vehicle is running, hot exhaust gases will pass through the tail pipe 54 and ball adaptor 60 into the boot portion 58, and then through the flexible exhaust suction hose 42 and then onward to the outside of the building. As can be seen from FIG. 2, the connection between the ball adaptor and the boot portion is quite loose so that ambient air can be drawn into the system past the ball adaptor, thereby cooling the vehicle exhaust gases and preventing unnecessary damage to the boot subassembly as well as the suction hose 42 from gases which may be too hot. This looseness is achieved by providing a recessed portion between the garter spring and the 45° elbow portion, the recessed portion being able to receive the spherical portion for rocking movement as can best be seen from FIG. 3. When the vehicle is to exit from the building through the doorway 18, the boot portion 52 will slip off the ball adaptor 60 relatively easily. As the boot portion 58 is only loosely supported on the ball adaptor 60 it is free to rotate as the vehicle moves, and it has been found that no unnecessary force is required to achieve disconnect. Because all metal parts of the coupling assembly are encased in a rubber-like material, there will be no damage to the finish of the vehicle.

In the embodiment illustrated the ball adaptor is connected to a 4 inch diameter exhaust pipe. However, it should be appreciated that other forms of ball adapters having coupling portions 60.1 which mate with exhaust pipes of differing cross sections can be readily manufactured. For example, if the exhaust pipe of the vehicle were of an oval cross section, the ball adaptor would have a coupling portion 60.1 of an oval cross section. Nevertheless, the other end of the ball adaptor would still be of a spherical shape as illustrated in the drawings. While this invention has been illustrated for use in a firehouse, it can be appreciated that there are many other situations where this invention may be utilized.

While the spring boot 62 is illustrated as being formed from a single molded part, it could be fabricated from a number of rubber-like parts. By providing the boot subassembly with a 45° elbow portion there is an improved angle of attachment which also assists the disconnect alignment and decreases the force necessary to disconnect. As the spherical portion of the ball adaptor only gradually increases in diameter from the cylindrical portion 60.1 to the major diameter of the spherical portion 60.3 it will allow the garter spring to smoothly pass over the spherical section during disconnect. This prevents a build-up of force necessary to disconnect.

It can be seen from the foregoing that the present invention overcomes the disadvantages of the prior art in a simple and relatively inexpensive manner. While a preferred form of this invention has been described above and shown in the accompanying drawings, it should be understood that the applicant does not intend to be limited to the particular details described above and illustrated in the accompanying drawings, but intends to be limited only to the scope of the invention as defined by the following claims.

What is claimed is:

1. An apparatus for removing vehicle exhaust gases from the exhaust pipe of a vehicle within a building; said apparatus comprising:

a flexible suction exhaust hose having first and second ends and an intermediate portion;

an exhaust fan for removing exhaust and ambient air from the building through the hose;

means connecting the exhaust fan to the first end of the flexible suction exhaust hose;

means for supporting the intermediate portion of the flexible suction exhaust hose in such a manner that the second end of the hose may move from a location within the building to a location adjacent a doorway of the building as a vehicle to which it is connected proceeds to exit from the building; and wherein the improvement comprises a coupling for coupling the second end of the flexible suction exhaust hose to the exhaust pipe of a vehicle, the coupling including a ball adapter through which hot gases may be discharged, the ball adaptor having a connection portion mounted on the exhaust pipe of the vehicle and a spherical portion, a boot subassembly comprising a boot made of a deformable rubber-like material, a garter spring mounted within the rubber-like boot, the spring having an internal diameter slightly less than the major external diameter of the ball adaptor which permits the boot subassembly to be readily connected to or disconnected from the ball adaptor by sliding the garter spring over the spherical portion of the ball adaptor and also which permits ambient air to flow between the exterior surface of the ball adapter and the boot when the boot subassembly is connected to the ball adapter, whereby ambient air mixes with the exhaust gases within the hose to reduce the temperature of the exhaust gases as it passes through the hose, and a hose coupler for connecting the boot to the second end of the flexible suction exhaust hose.

2. The apparatus as set forth in claim 1 wherein the boot is provided with a recessed portion inwardly of the garter spring so that the ball adapter can rock within the boot.

3. The apparatus as set forth in claim 1 wherein the boot has an enlarged end portion and a 45° elbow portion, the enlarged end portion being provided with a spring receiving groove, the length of the enlarged end portion being greater than the length of the spherical portion of the ball adaptor, and wherein the garter spring is mounted within the spring receiving groove of the rubber-like boot, the garter spring having an external diameter equal to or slightly greater than the internal diameter of the spring receiving groove.

4. The apparatus as set forth in claim 3 wherein the enlarged end portion of the boot is provided with a pair of internal closely spaced together generally cylindrically shaped abutments, the abutments forming therebetween the spring receiving groove.

5. The apparatus as set forth in claim 3 wherein the hose coupler is a rigid coupler secured to the end of the 45° elbow portion remote from the enlarged end.

6. The apparatus as set forth in claim 5 wherein the rigid coupler is provided with a bead, and further characterized by the provision of a screen carried within the bead.

* * * * *